US006881245B2

(12) United States Patent
Nichols et al.

(10) Patent No.: US 6,881,245 B2
(45) Date of Patent: Apr. 19, 2005

(54) MEMBRANE AIR DRYER AND METHOD OF MOUNTING A MEMBRANE DRYER TO A VEHICLE

(75) Inventors: Randall W. Nichols, Westlake, OH (US); Fred W. Hoffman, Columbia Station, OH (US); Leonard A. Quinn, Lagrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 55 days.

(21) Appl. No.: 10/274,215

(22) Filed: Oct. 18, 2002

(65) Prior Publication Data

US 2004/0074721 A1 Apr. 22, 2004

(51) Int. Cl.[7] .......................... B01D 53/22; B01D 53/26
(52) U.S. Cl. .................. 96/8; 95/52; 96/10; 210/321.8
(58) Field of Search .............................. 95/52; 96/4, 8, 96/10; 210/321.8, 321.89

(56) References Cited

U.S. PATENT DOCUMENTS

| | | |
|---|---|---|
| 4,397,661 A | 8/1983 | King et al. |
| 4,670,145 A | 6/1987 | Edwards |
| 4,718,921 A | 1/1988 | Makino et al. |
| 4,857,081 A | 8/1989 | Taylor |
| 4,883,023 A | 11/1989 | Tsang et al. |
| 4,929,259 A | 5/1990 | Caskey et al. |
| 4,961,760 A | 10/1990 | Caskey et al. |
| 5,002,590 A | 3/1991 | Friesen et al. |
| 5,013,331 A | 5/1991 | Edwards et al. |
| 5,013,437 A | 5/1991 | Trimmer et al. |
| 5,067,971 A | 11/1991 | Bikson et al. |
| 5,084,073 A | 1/1992 | Prasad |
| 5,160,514 A | 11/1992 | Newbold et al. |
| 5,169,412 A | 12/1992 | Prasad et al. |
| 5,240,472 A | 8/1993 | Sircar |
| 5,259,869 A | 11/1993 | Auvil et al. |
| 5,282,964 A | 2/1994 | Young et al. |
| 5,282,966 A | 2/1994 | Walker |
| 5,314,528 A | 5/1994 | Monereau |
| 5,411,662 A | 5/1995 | Nicolas et al. |
| 5,470,469 A | 11/1995 | Eckman |
| 5,525,143 A | 6/1996 | Morgan et al. |
| 5,554,283 A | 9/1996 | Brinda et al. |
| 5,584,914 A | 12/1996 | Senoo et al. |
| 5,605,564 A | 2/1997 | Collins |
| 5,614,099 A | 3/1997 | Hirose et al. |
| 5,681,368 A | 10/1997 | Rahimzadeh |
| 5,779,897 A | 7/1998 | Kathod et al. |
| 5,800,597 A | 9/1998 | Perrotta et al. |
| 5,837,033 A | 11/1998 | Giglia et al. |
| 5,843,351 A | 12/1998 | Hirose et al. |
| 5,851,267 A | 12/1998 | Schwartz |
| 5,885,329 A | 3/1999 | Hermann |
| 5,961,692 A | 10/1999 | Collins |
| 6,004,383 A | 12/1999 | Kuhnelt |
| 6,019,822 A | 2/2000 | Kanzawa et al. |
| 6,027,546 A | 2/2000 | Kusters et al. |
| 6,070,339 A | 6/2000 | Cunkelman |
| 6,087,029 A | 7/2000 | Golovin et al. |
| 6,126,724 A | 10/2000 | Martin et al. |

(Continued)

Primary Examiner—Robert H. Spitzer
(74) Attorney, Agent, or Firm—Calfee, Halter & Griswold LLP

(57) ABSTRACT

A method and apparatus for mounting an air dryer to a commercial vehicle is provided. The end caps of the membrane air dryer are used to retain the membrane air dryer core and attach the membrane air dryer to the surface of the air supply reservoir. Bosses can be welded to the external surface of the air supply reservoir, which can then be used to mount the membrane air dryer by bolting the end caps to the bosses. The method and apparatus can be applied to two or three tank air supply reservoir systems. A disengagement tank may be included within the air dryer system, in place of a coalescing filter, to reduce the amount of moisture that reaches the membrane air dryer core.

32 Claims, 3 Drawing Sheets

U.S. PATENT DOCUMENTS

| | | |
|---|---|---|
| 6,128,825 A | 10/2000 | Cunkelman |
| 6,210,464 B1 | 4/2001 | Nakanishi et al. |
| 6,296,683 B1 | 10/2001 | Koch |
| 6,346,142 B1 | 2/2002 | Jetter et al. |
| 6,358,300 B1 | 3/2002 | Fornof et al. |
| 6,370,887 B1 | 4/2002 | Hachimaki |
| 6,540,817 B1 * | 4/2003 | Hachimaki .................. 96/8 |
| 2003/0209141 A1 * | 11/2003 | Wedge et al. ............... 95/45 |

* cited by examiner

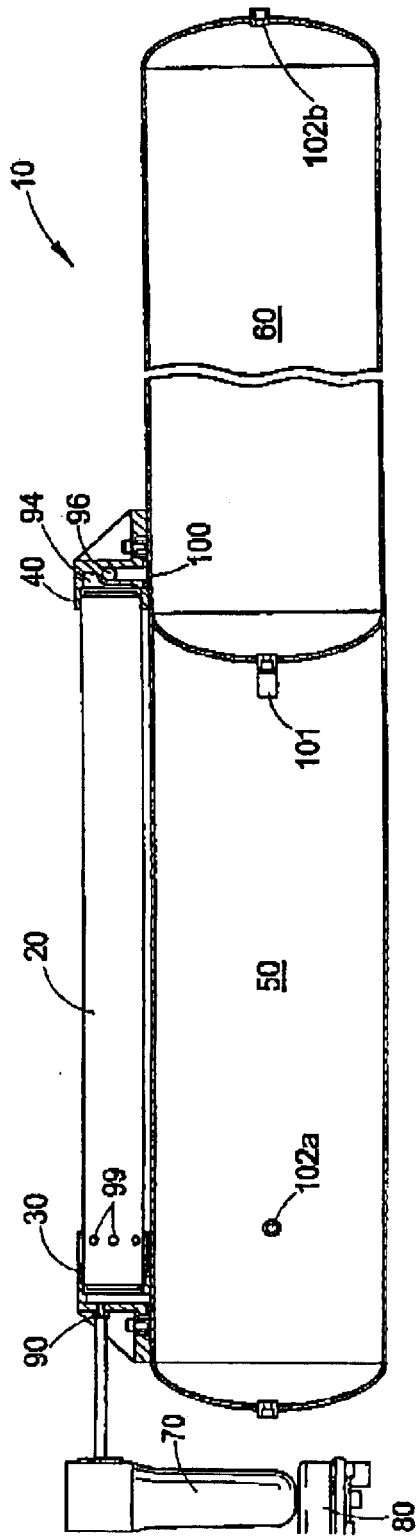
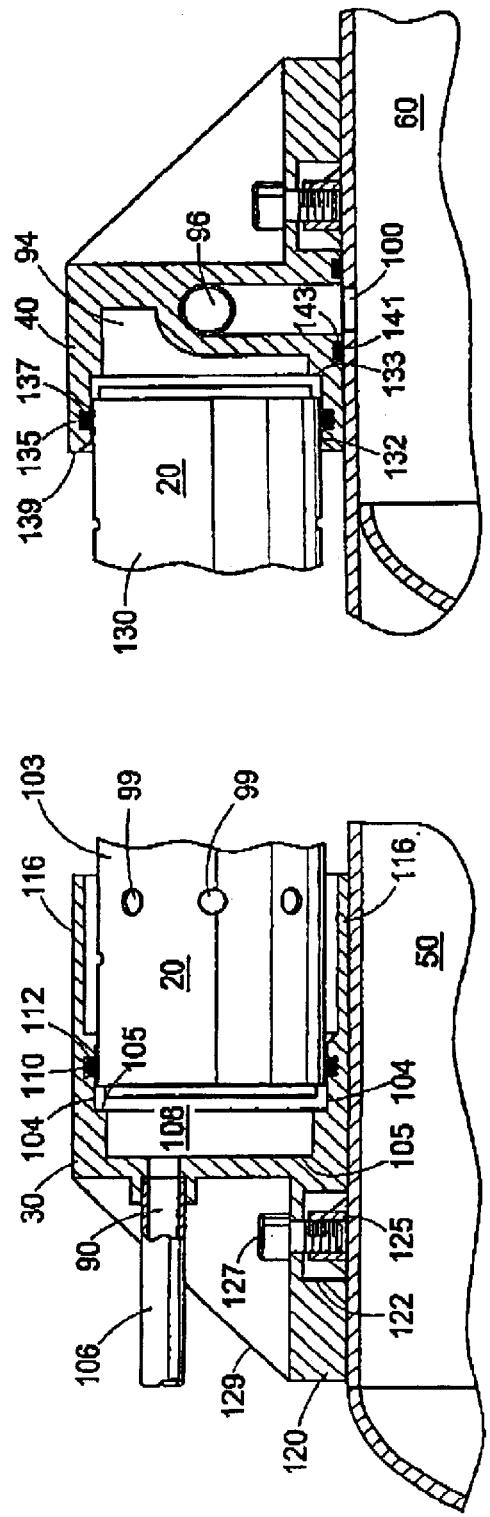
FIG. 1
FIG. 2
FIG. 3

MEMBRANE AIR DRYER AND METHOD OF MOUNTING A MEMBRANE DRYER TO A VEHICLE

BACKGROUND OF THE INVENTION

This invention relates to an air dryer assembly for a compressed air system, such as, for example, a compressed air braking system for commercial vehicles, and more specifically to a membrane air dryer and method and apparatus for mounting a membrane dryer.

Commercial vehicles such as trucks, buses, and large commercial vehicles are typically equipped with a compressed air braking system in which the brakes of the vehicle are actuated by compressed air. An air compressor is operated by the vehicle engine and storage reservoirs maintain a quantity of pressurized air for the brakes and other compressed air uses. Moisture and oil are two attendant problems associated with compressed air systems and are particularly problems that can adversely affect brake system operation.

As a result, an air dryer is incorporated into the compressed air system to effectively remove moisture from the system. Typically, an air dryer contains a desiccant material that adsorbs moisture from the compressed air from the compressor. However, desiccant dryers become saturated, and as a result, require a purge cycle. During the purge cycle, the compressor does not supply compressed air to the system and a backflow of air purges the desiccant material of its moisture content.

Membrane air dryers have been used to provide a continuous flow of compressed air to the system. Membrane air dryers allow for a continuous flow of compressed air through a packet of small, hollow tubes within a tubular membrane dryer housing. The hollow fibers are typically a porous plastic material that are coated with a special material that causes the tubes to be permeable to water vapor, but not air. Thus, as air is passed through the membrane dryer hollow fibers, water vapor permeates the fiber walls and collects on the outside of the hollow fibers. Meanwhile, dry air is permitted to pass through to the rest of the system. In order to avoid the accumulation of water vapor on the outside of the fibers, thereby saturating the system, a portion of the dried air is permitted to pass back through the membrane air dryer, this time on the outside of the fibers. The backflow of air is allowed to expand, pickup the water vapor on the outside of the tubes, and then exit the membrane air dryer, typically to atmosphere. Furthermore, since oil vapors, liquid water, carbonous materials, and other contaminants reduce the effectiveness of the membrane air dryer, a filter is typically provided upstream of the membrane air dryer.

While membrane air dryers have been established as competitive technology to desiccant dryers in plants and laboratories, membrane air dryers have not been notably implemented on vehicles for compressed air systems partially due to the difficulty in mounting the membrane air dryers to the vehicle. In the past, membrane air dryers have been incorporated into the main air reservoir of the air brake system. However, such mounting configurations do not provide easy access to the membrane air dryer for regular maintenance, inspection, repair or replacement.

Furthermore, typical mounting structures for membrane air dryers require a separate set of mounting brackets for securing the membrane air dryer to a vehicle.

Accordingly, a need exists for a membrane air dryer design that can be effectively and efficiently mounted to a vehicle in a location that provides relatively easy access for maintenance, inspection, repair or replacement.

BRIEF SUMMARY OF THE INVENTION

A method and apparatus for mounting a membrane air dryer is provided. One aspect of the present invention is a method and apparatus for mounting a membrane air dryer to a vehicle. In one embodiment, the end caps of the membrane air dryer are attached to the air supply reservoir of a commercial vehicle. In order to mount the membrane air dryer, bosses can be welded to the external surface of the reservoir to provide a means for engaging the membrane air dryer end caps.

Another embodiment of the present invention incorporates a disengagement tank into the air dryer assembly. The disengagement tank can be incorporated into the air supply reservoir and provide an outlet that leads to the membrane air dryer core.

BRIEF DESCRIPTION OF THE DRAWINGS

FIG. 1 is a side view of a membrane air dryer and mounting end caps of the present invention.

FIG. 2 is a close-up view of the supply end cap of a membrane air dryer.

FIG. 3 is a close-up view of the delivery end cap of a membrane air dryer.

DETAILED DESCRIPTION

Figure 4:
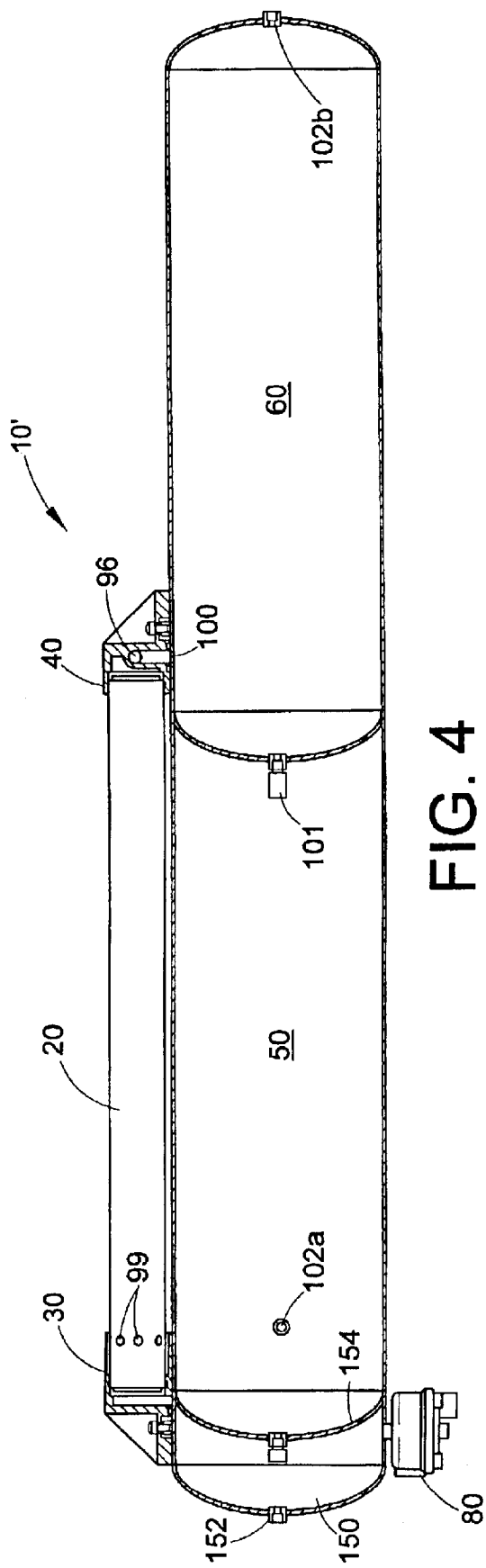
FIG. 4 is a side view of an embodiment of a membrane air dryer incorporating a disengagement tank into the bulkhead of the primary air supply tank.

FIG. 1 illustrates the air dryer system of the present invention, generally referenced as 10, which includes a membrane air dryer core 20, a supply end cap 30, a delivery end cap 40, and an air reservoir including a primary air supply tank 50, and a wet tank 60. The air dryer system 10 optionally includes a coalescing filter 70, located upstream from the membrane air dryer core 20 to filter out oil vapor, liquid water, carbonous material, and other contaminants. It should be appreciated by one skilled in the art that the coalescing filter 70 may be a variety of types of filters and may have various configurations. For example, the coalescing filter 70 shown in FIG. 1 is a Bendix PuraGuard filter coupled with a Bendix DV-2 pressure swing drain valve 80.

Compressed air from the compressor is typically saturated with oil vapor, and contains aerosol oil, oil, water vapor, liquid water, carbonous material, and other contaminants. The compressed air is delivered to the coalescing filter 70, which separates out the heavier contaminants, such as the oil, oil vapor and liquid water. Such contaminants flow to the bottom of the coalescing filter 70, typically by gravity, where the contaminants are collected until discharged through the drain valve 80. The compressed air is then fed into the membrane air dryer core 20, through air inlet 90 located in the supply end cap 30. The compressed air is then fed through the membrane air dryer core 20 wherein water vapor is separated from the compressed air.

Since the membrane air dryer core 20 operates in a conventional manner and can take on a number of shapes and configurations, the details of the operation of the membrane air dryer have been omitted from this disclosure. However, since the preferred mounting position for the air dryer is adjacent to the air supply reservoirs, the membrane air dryer may be tubular with a 1–3 inch diameter and 18 to 36 inches long. These numbers are intended to be exemplary in nature and should not be construed in a limiting sense.

The compressed air, after traveling through the plurality of membrane air dryer hollow fibers, is now dry and collected in the delivery volume 94 located in the delivery end cap 40. The dried compressed air in the delivery volume 94 is either fed through the membrane air dryer core 20 as backflow, or through a delivery check valve 96 to the air supply tanks 50 and 60. The backflow travels along the outside of the membrane air dryer fibers, collects the water vapor and vents to the atmosphere through vent holes 99. Air that passes through the delivery check valve 96 passes through the wet tank delivery port 100 and into the wet tank 60, which is connected to the primary air supply tank by check valve 101. Air can then be delivered to the rest of the system through air delivery ports 102*a* and 102*b*.

Now referring to FIG. 2, the supply end cap 30 is made from any suitable material, including cast aluminum, and is dimensioned to receive the supply side 103 of the membrane air dryer core 20 in a firm fitting fashion along the inner side wall 104 and end wall 105 of the supply end cap 30. Air from the filter enters the supply end cap 30 from the air supply line 106 through air inlet 90. The compressed air then passes to supply volume 108 prior to entering the membrane air dryer fibers. The compressed air is retained within the supply volume 108 by seal 110 located in a recess 112 in the inner wall 104 of the supply end cap 30. The supply end cap 30 further includes an extended skirt 116 that extends across the length of the membrane air dryer core 20 covering vent holes 99, thereby protecting the vent holes from dirt and debris. However, in order to enable air and water to escape the vent holes 99, the extended skirt 116 is raised from the surface of the membrane air dryer core 20.

Supply end cap 30 is mounted to the surface of the primary air supply tank 50. In one embodiment, as shown in FIG. 2, the supply end cap 30 includes an extended brace portion 120 that rests along the contour of the primary air supply tank 50. A cutout portion 122 of the brace portion 120 receives a boss 125, which is welded to the primary air supply tank 50. A bolt 127 can then be threaded through a hole in the brace portion 120 and received within a mating set of threads within the boss 125. In other embodiments, additional bolts are used to further the supply end cap 30 to the primary air supply tank 50. Furthermore, in another embodiment, one or more bolts secure the end cap in a forward region of the end cap. Moving the bolts forward helps to alleviate the torque produced by the compressed air entering the membrane air dryer core 20. In another embodiment, a gusset 129 is added to the supply end cap 30 to provide additional support.

FIG. 3 illustrates the delivery end cap 40. The delivery end cap 40 is made from any suitable material, including cast aluminum, and is dimensioned to receive the delivery side 130 of the membrane air dryer core 20 in a firm fitting fashion along the inner side wall 132 and end wall 133 of the delivery end cap 40. Dried compressed air enters the delivery end cap 40 from the membrane air dryer core 20 into the delivery volume 94. The compressed air is retained within the delivery volume 94 by seal 135 located in a recess 137 in the inner wall 132 of the delivery end cap 40. In one embodiment, the delivery end cap 40 contains a short skirt 139; however, in other embodiments, the skirt 139 may be elongated (like the supply side) in order to assist in the retention of the membrane air dryer core 20. The dried compressed air in the delivery volume 94 either reenters the membrane air dryer core 20 as backflow for collecting and venting the water vapor, or is delivered to the wet tank 60 through the delivery check valve 96 and wet tank delivery port 100. Face seal 141 can be added to a recess 143 in the bottom of the delivery end cap 40 around the wet tank delivery port 100 to provide an air tight seal.

Delivery end cap 40 is mounted to the surface of the wet tank 60. In one embodiment, the delivery end cap 40 is attached to the wet tank 60 in a similar manner that the supply end cap 30 is attached to the primary air supply tank 50. In other embodiments, different fastening means are employed to secure the delivery end cap 40 to the wet tank 60.

Figure 5:
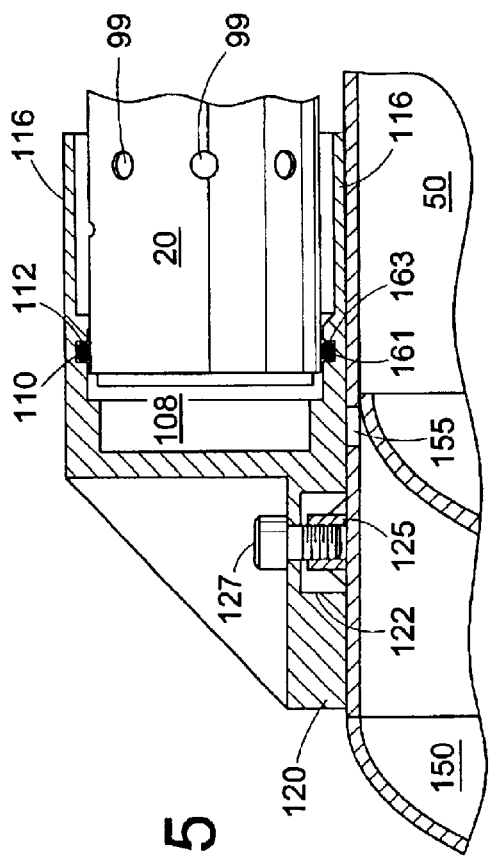
FIG. 5 is a close-up view of the supply end cap of the membrane air dryer of FIG. 4.

FIG. 4 illustrates another embodiment of the present invention wherein a disengagement tank 150 is employed to collect and vent water vapor. Compressed air from the compressor and air filter enters the membrane air dryer assembly 10' through inlet 152 in the disengagement tank 150. The disengagement tank 150 is created by extending the primary air supply tank 50 and adding a bulkhead 154 to separate the two tanks. As the compressed air enters the disengagement tank 150, it slows and cools thereby allowing water to condense and fall to the bottom of the tank. A drain valve 80 can be added to the bottom of the disengagement tank 150 to vent the condensed water vapor. As shown in FIG. 5, air from the disengagement tank 150 enters the supply volume 108 through disengagement outlet port 155. Face seal 161 can be added to a recess 163 in the bottom of the supply end cap 30 around disengagement tank outlet poll 155 to provide an air tight seal. The remaining aspects of the membrane air dryer assembly 10' are similar to membrane air dryer assembly 10.

Figure 6:
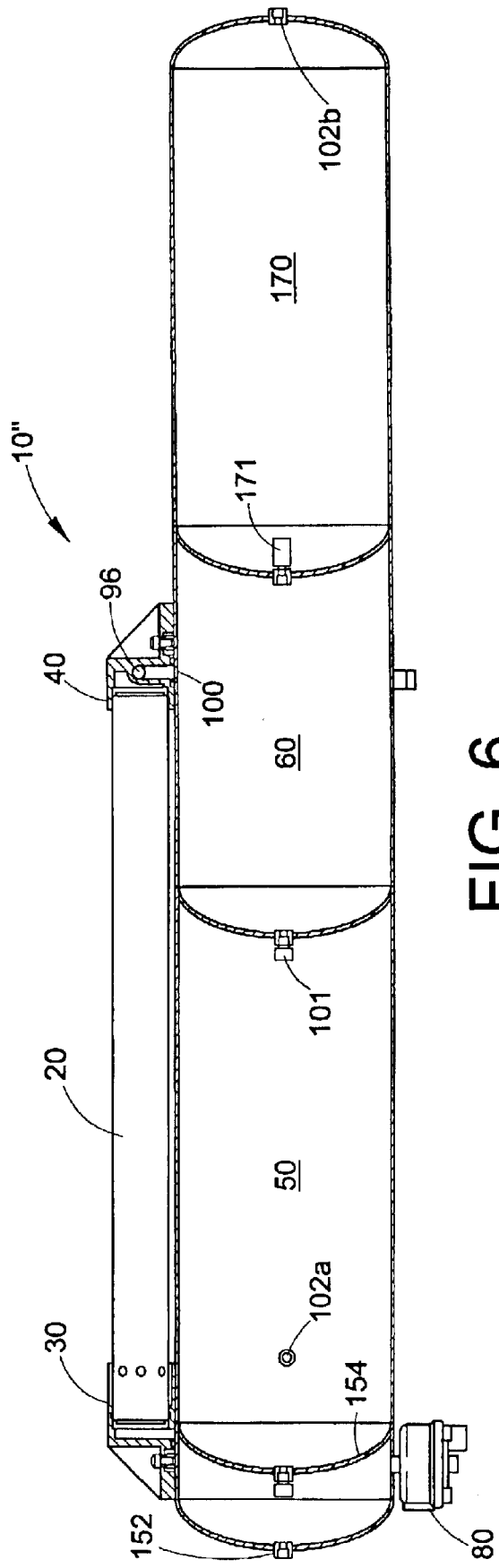
FIG. 6 is a membrane air dryer and mounting end caps mounted to a three tank air reservoir system.

FIG. 6 illustrates a third embodiment of the membrane air dryer assembly 10" of the present invention, wherein a three tank reservoir system is employed. As with the other embodiments, dry compressed air enters the wet tank 60 though delivery check valve 96 and wet tank inlet 100. Once in the wet tank 60, the air can pass to the primary air supply tank 50 through check valve 101 or to secondary air supply tank 170 through check valve 171. Air can then be delivered to the remaining components of the compressed air system through air ports 102*a* and 102*b*.

Although the Figures show the air supply reservoirs as one unit separated by bulk heads, either as a two tank system or three tank system, one skilled in the art should appreciate that the tanks may be separate units. Furthermore, additional tanks may be used or the mounting to the tanks can be done is a different arrangement. One skilled in the art should appreciate that these modifications are within the scope of this application.

The present invention also encompasses a method of mounting a membrane air dryer to a vehicle. Since the membrane air dryer has a matching shape as the air supply reservoir, and since the membrane air dryer discharges to the air supply reservoir, it is advantageous to mount the membrane air dryer adjacent to the air supply reservoir. Bosses 125 are welded to the air supply reservoir tank, or tanks, at a predetermined distance depending on the length of the membrane air dryer. The membrane dryer end caps 30 and 40, with the membrane air dryer core 20 therebetween, are then secured directly to the bosses 135 by one or more bolts 127. The delivery end cap 40 is aligned such that the delivery check valve 96 connects to the wet tank inlet port 100.

It will be appreciated that the membrane air dryer assembly can take the form of various configurations and mounting arrangements. It should be further understood that the membrane air dryer and corresponding end caps can be used either with new equipment, or retrofit to attach to existing components. Such existing components may cause minor alterations to the design of the membrane air dryer; however one skilled in the art should appreciate that these minor modifications fall within the scope of this application. This invention is intended to include such modifications and alterations in so far as they fall within the scope of the appended claims or the equivalents thereof.

What is claimed is:

1. An air dryer assembly for a compressed air system comprising:
   a supply end cap and a delivery end cap with a membrane air dryer core therebetween;
   an air supply reservoir; and
   a mechanism for coupling said end caps to said air supply reservoir.

2. The air dryer assembly of claim 1, wherein said supply end cap comprises a skirt that covers a set of vent holes in said membrane air dryer core.

3. The air dyer assembly of claim 1, wherein said supply end cap comprises a supply volume and a seal along an inner surface of the supply end cap.

4. The air dryer assembly of claim 1, wherein said delivery end cap comprises a delivery volume and a seal along an inner surface of the delivery end cap.

5. The air dryer assembly of claim 1, wherein said delivery end cap comprises a check valve that communicates with an inlet port to said air supply reservoir.

6. The air dryer assembly of claim 5, wherein said delivery end cap further comprises a seal around the inlet port to said air supply reservoir.

7. The air dryer assembly of claim 1, wherein said membrane air dryer is attached adjacent to said air supply reservoir.

8. The air dryer assembly of claim 1, wherein said membrane air dryer is attached to the external surface of said air supply reservoir.

9. The air dryer assembly of claim 1, wherein said air supply reservoir comprises two air supply tanks.

10. The air dryer assembly of claim 1, wherein said air supply reservoir comprises three air supply tanks.

11. The air dryer assembly of claim 1, wherein said mechanism for coupling said end caps to said air supply reservoir comprises a met of one or more bosses affixed to said air supply reservoir and one or more corresponding bolts.

12. The air dryer assembly of claim 1, wherein at least one of said end caps further comprises a gusset.

13. The air dryer assembly of claim 1 further comprising a disengagement tank.

14. The air dyer assembly of claim 13, wherein said disengagement tank is incorporated into said air supply reservoir.

15. The air dryer assembly of claim 13, wherein said disengagement tank comprises a outlet port in communication with a supply volume in said supply end cap.

16. The air dryer assembly of claim 15 further comprising a seal around the outlet port from said disengagement tank.

17. The air dryer assembly of claim 13, wherein said disengagement tank comprises a drain valve.

18. The air dryer assembly of claim 1, wherein said air supply reservoir is used in connection with an air brake system of a commercial vehicle.

19. A membrane dryer end cap comprising:
   a means for receiving a membrane air dryer core;
   a port communicating with said membrane air dryer core; and
   a means for attaching said end cap to an air supply reservoir.

20. The membrane air dryer end cap of claim 19 further comprising a seal positioned around said port.

21. The membrane air dryer end cap of claim 19 further comprising a seal positioned around said means for receiving a membrane air dryer core.

22. The membrane air dryer end cap of claim 19 further comprising an elongated skirt that covers a portion of the membrane air dryer core.

23. The membrane air dryer end cap of claim 19, wherein said means for attaching said end cap to an air supply reservoir comprises a means for receiving a boss and a bolt that secures said end cap to the boss.

24. The membrane air dryer end cap of claim 19 further comprising a gusset.

25. The membrane air dryer end cap of claim 19, wherein said air supply reservoir is used in connection with an air brake system of a commercial vehicle.

26. The membrane air dyer end cap of claim 19, wherein said port contains a check valve.

27. A method of mounting a membrane air dryer comprising the steps of:
   welding one or more bosses onto an air supply reservoir; and
   bolting one or more membrane air dryer end caps to said bosses.

28. The method of claim 27 further comprising the steps of:
   bolting the first of said end caps to said boss;
   attaching a first end of a membrane air dyer core to a first end cap;
   attaching a second end of the membrane air dryer core to a second end cap; and
   bolting the second end cap to said boss.

29. The method of claim 27 further comprising the step of aligning at least one of said end caps to a port in said air supply reservoir.

30. The method of claim 27 wherein a membrane air dryer core is attached adjacent to said air supply reservoir.

31. The method of claim 27, wherein a membrane air dryer core is attached to the outer surface of said air supply reservoir.

32. The method of claim 27, wherein said air supply reservoir is used in connection with an air brake system of a commercial vehicle.

* * * * *